Figure 1:
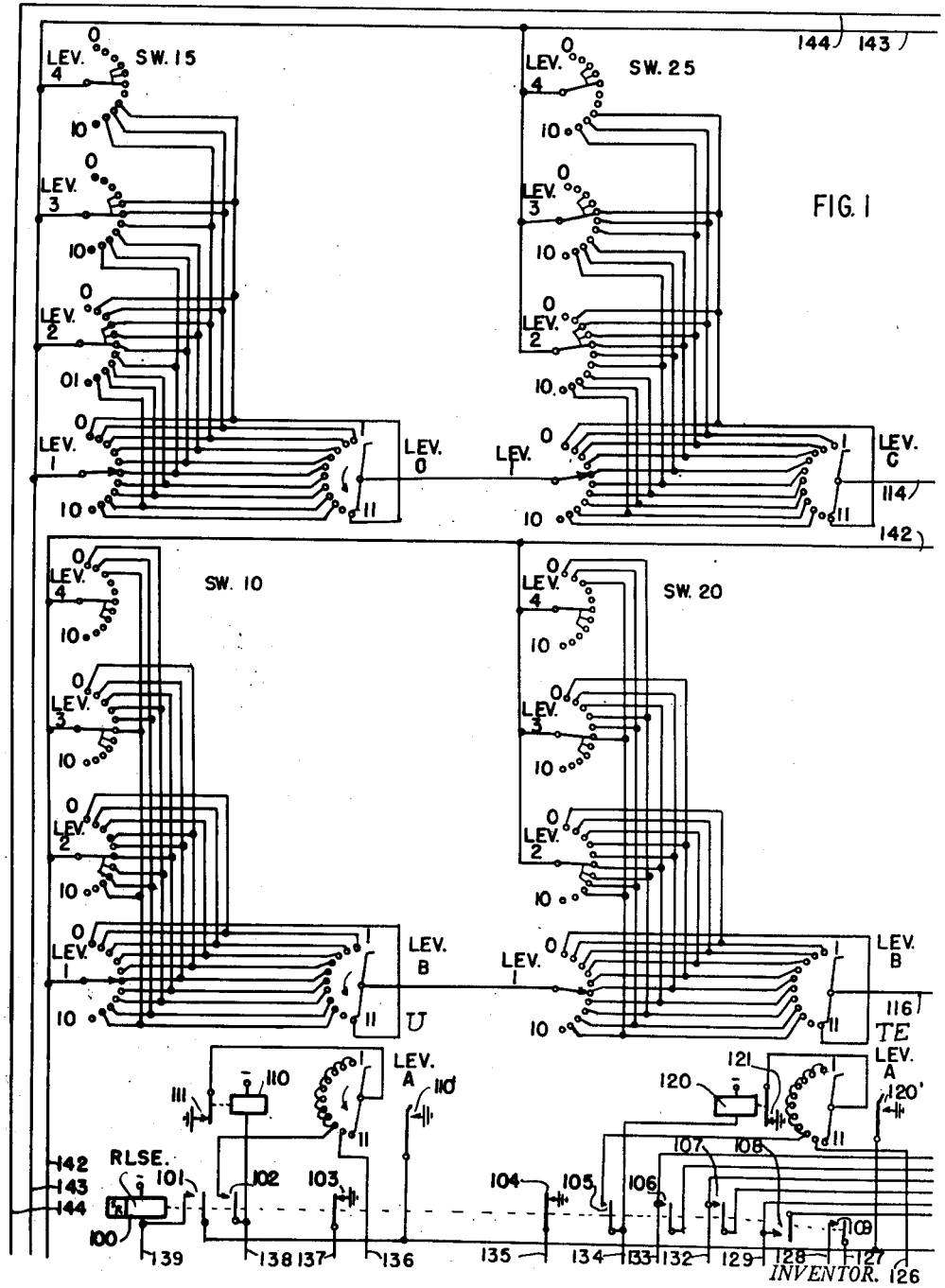

Nov. 11, 1952  R. W. JONES  2,617,589
BINOMINAL SEQUENTIAL ANALYZER
Filed Dec. 30, 1947  7 Sheets-Sheet 1

INVENTOR.
ROY W. JONES
BY Wm. Walter Owen.
ATTORNEY

Nov. 11, 1952        R. W. JONES        2,617,589
BINOMINAL SEQUENTIAL ANALYZER
Filed Dec. 30, 1947        7 Sheets-Sheet 2
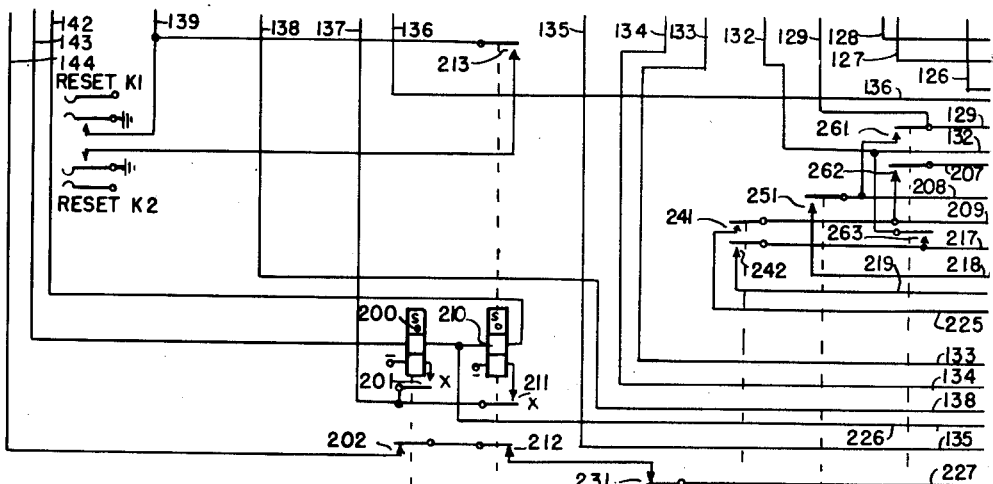
FIG.2
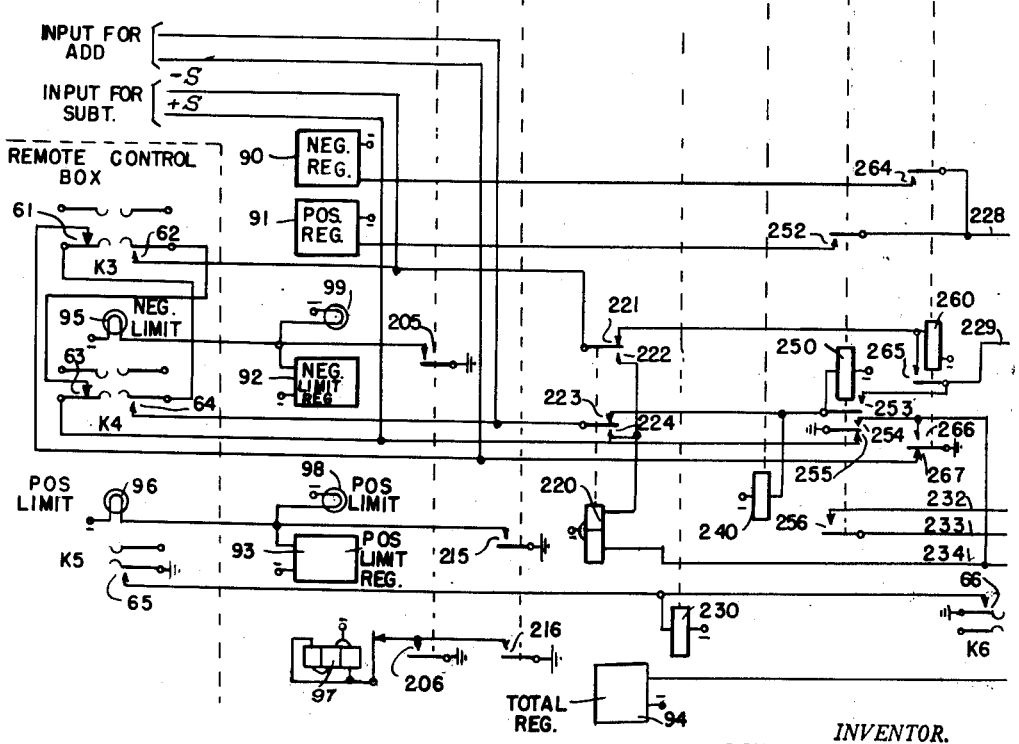
INVENTOR.
ROY W. JONES
BY Mr. Walter Owen
ATTORNEY Nov. 11, 1952 R. W. JONES 2,617,589
BINOMINAL SEQUENTIAL ANALYZER
Filed Dec. 30, 1947 7 Sheets-Sheet 4

INVENTOR.
ROY W. JONES
BY *Wm Walter Owen*
ATTORNEY

Nov. 11, 1952     R. W. JONES     2,617,589
BINOMINAL SEQUENTIAL ANALYZER
Filed Dec. 30, 1947     7 Sheets-Sheet 5

INVENTOR.
ROY W. JONES
BY *Wm Walter Owen*
ATTORNEY

Patented Nov. 11, 1952

2,617,589

UNITED STATES PATENT OFFICE 2,617,589

BINOMIAL SEQUENTIAL ANALYZER

Roy W. Jones, Rochester, N. Y., assignor to Automatic Electric Laboratories, Inc., Chicago, Ill., a corporation of Delaware Application December 30, 1947, Serial No. 794,483

14 Claims. (Cl. 235—61)

The present invention relates in general to adding machines and more particularly to an adding machine arranged to be used as a binomial sequential analyzer.

Briefly, binomial sequential analysis is an analytical method of interpreting inspection and test data according to certain mathematical formulae. It is defined as a statistical test procedure which gives a specific rule, at any stage of the experiment, for making one of the following three decisions: (1) Accept the subject matter under test, (2) reject the subject matter under test, (3) continue taking observations.

The process of sequential analysis finds a useful application in the field of production testing and inspection—i. e., where a sample is taken from a finished lot of goods and is tested, the passing or rejection of the finished lot being dependent upon the results obtained from testing the sample. A distinction may be made between a multiple sampling procedure and a sequential procedure in that a multiple sampling procedure eliminates, at a predetermined sample size, the possibility of deciding to obtain further data. Under the sequential plan, the inspection will be terminated as soon as the quality of the sample has been determined within the limits of the probability risks established. The chief merit of sequential analysis, then, is that it may require smaller samples than multiple sampling.

The method of sequential analysis involves the addition of a predetermined discrete value for every good sample examined and the subtraction of a predetermined discrete value for every bad sample examined. If a predetermined negative total is reached the lot under inspection is rejected or if a predetermined positive total is reached the lot is accepted as good. In sequential inspection, the size of the sample, for a particular lot is left undetermined; the sequential procedure is to inspect one piece at a time, inspection being continued until the cumulated evidence is sufficiently strong, one way or the other, for the analyzer to call the lot good or bad. Thus conspicuously good lots are quickly accepted; conspicuously bad lots are quickly rejected. Extensive inspection is needed chiefly by lots of doubtful quality—which is as it should be.

In accordance with the usual practice of any inspection plan certain tolerances are set up in order to classify each sample inspected as to its classification of being good or bad. A sequential analysis plan is completely determined by four established numerical quantities. Two of these quantities specify (1) what is considered a good lot and (2) what is considered a bad lot.

Dependent upon the article being manufactured and in accordance with the usual practice a lot may be arbitrarily termed as acceptable if only a predetermined percentage is bad, while lots with a second predetermined percentage bad are non-acceptable, and lots having percentages bad between the above mentioned percentages being left indeterminate. The established acceptable percentage for accepting a good lot will now be designated P1 and the established unacceptable percentage for rejecting a bad lot will now be designated P2. P1 therefore equals the percentage bad of a lot which the user is willing to accept as a good lot. P2 then equals the percentage bad of a lot which the user is unwilling to accept and therefore will reject a lot with P2 percentage.

It is well known that in any sampling inspection procedure, where there is not 100% inspection, there is always some possibility, or risk, of making a wrong decision and therefore the two other numerical quantities to be determined in the sequential analysis plan are (3) what risk is the inspector or user) willing to run of rejecting a good lot, and (4) what risk is the inspector (or user) willing to run of accepting a bad lot.

The user is willing to take a certain percentage risk of rejecting good material, for example, say, one chance in a hundred, or .01. This percentage risk will be designated $(\alpha)$ (the Greek letter "alpha") and in the example given $(\alpha) = .01$.

The user is also willing to take a different percentage risk of accepting bad material, for example, say two chances in a hundred, or .02. This different percentage risk will be designated $(\beta)$ (the Greek letter "beta") and in the example given $(\beta) = .02$.

From the foregoing it will be seen that the tolerated risks are characterized by four numbers P1, P2, $(\alpha)$ and $(\beta)$ which are established on a basis of practical considerations commensurate with the item being inspected and will naturally assume different values dependent upon the different types of apparatus or items being inspected. When quantities P1, P2, $(\alpha)$ and $(\beta)$ have been established the necessary computations defining sequential inspection can be computed by means of the following formulae which were derived from formulae given in "Sequential Analysis of Statistical Data: Applications," a report prepared by the Statistical Research Group of Columbia University and published by the Columbia University Press, Sept. 1945. Another publication "Sequential Analysis" by Abraham Wald, published in 1947 also deals with this new method of statistical analysis:

In order to perform a sequential analysis, four quantities must be known: (1) The additive quantity (2) the positive limit (3) the negative limit and (4) the subtractive quantity. In the present example the subtractive quantity is taken as 1000 for all cases. These quantities are determined by the following equations.

(1) $\quad$ Additive quantity $=\dfrac{\log\dfrac{1-P1}{1-P2}}{\log\dfrac{P2}{P1}}\times 1000$ (2) $\quad$ Positive limit $=\dfrac{\log\dfrac{1-a}{b}}{\log\dfrac{P2}{P1}}\times 1000$ (3) $\quad$ Negative limit $=\dfrac{\log\dfrac{a}{1-b}}{\log\dfrac{P2}{P1}}\times 1000$ Where $P1$ = the acceptable quality tolerance limit for the lot expressed as a fraction defective.
$P2$ = the acceptable quality tolerance limit for the lot, expressed as a fraction defective.

Where $a$ = the maximum risk or probability of rejecting lots of quality P1 or better, expressed as a decimal fraction.
$\beta$ = the maximum risk or probability of accepting lots of quality P2 or worse, expressed as a decimal fraction.

The quantity 1000 appearing in the above formulae is a result of arbitrarily choosing the value 1000 for the subtractive quantity. Any value desired may be used instead provided that the other quantities are modified accordingly as indicated in the formulae. The additive quantity is generally a decimal fraction of the subtractive quantity, hence the choice of 1000 for the subtractive quantity permits the additive quantity to be conveniently expressed as a whole number.

The above-mentioned formulae and the basis for such formulae are not considered part of this invention and are being shown and briefly explained only for the purpose of showing the utility of the calculating machine which comprises applicant's invention.

Having briefly described the system of sequential analysis with which the instant invention is concerned and the mathematical formulae upon which this system of analysis is based, it is clearly the principal object of the present invention to provide a type of automatic adding machine so arranged as to perform the functions of a binomial sequential analyzer.

Another object of the invention is the provision of a type of adding machine which will automatically add a predetermined discrete quantity called the additive quantity for every additive input to the machine.

A further feature of the invention is the provision of a type of adding machine which will automatically subtract a predetermined discrete quantity for every subtractive input to the machine.

A still further object of the invention is the provision of a type of adding machine which will give a signal when the cumulative total resulting from various inputs to the machine has reached a predetermined positive quantity.

Another object of the invention is the provision of a type of adding machine which will give a signal when the cumulative total resulting from various inputs to the machine has reached a predetermined negative quantity.

A feature of the invention is the provision of a device accomplishing the above objects and having a plurality of registers for indicating the number of additive inputs made to the machine, the number of subtractive inputs made to the machine, the total number of inputs made to the machine, the number of positive limits reached by the machine, and the number of negative limits reached by the machine.

A better understanding of the invention will be had upon a further perusal of the specification taken in conjunction with the accompanying drawings which, when arranged with adjoining lines abutting as indicated in Fig. 8, discloses the invention.

Figure 3:
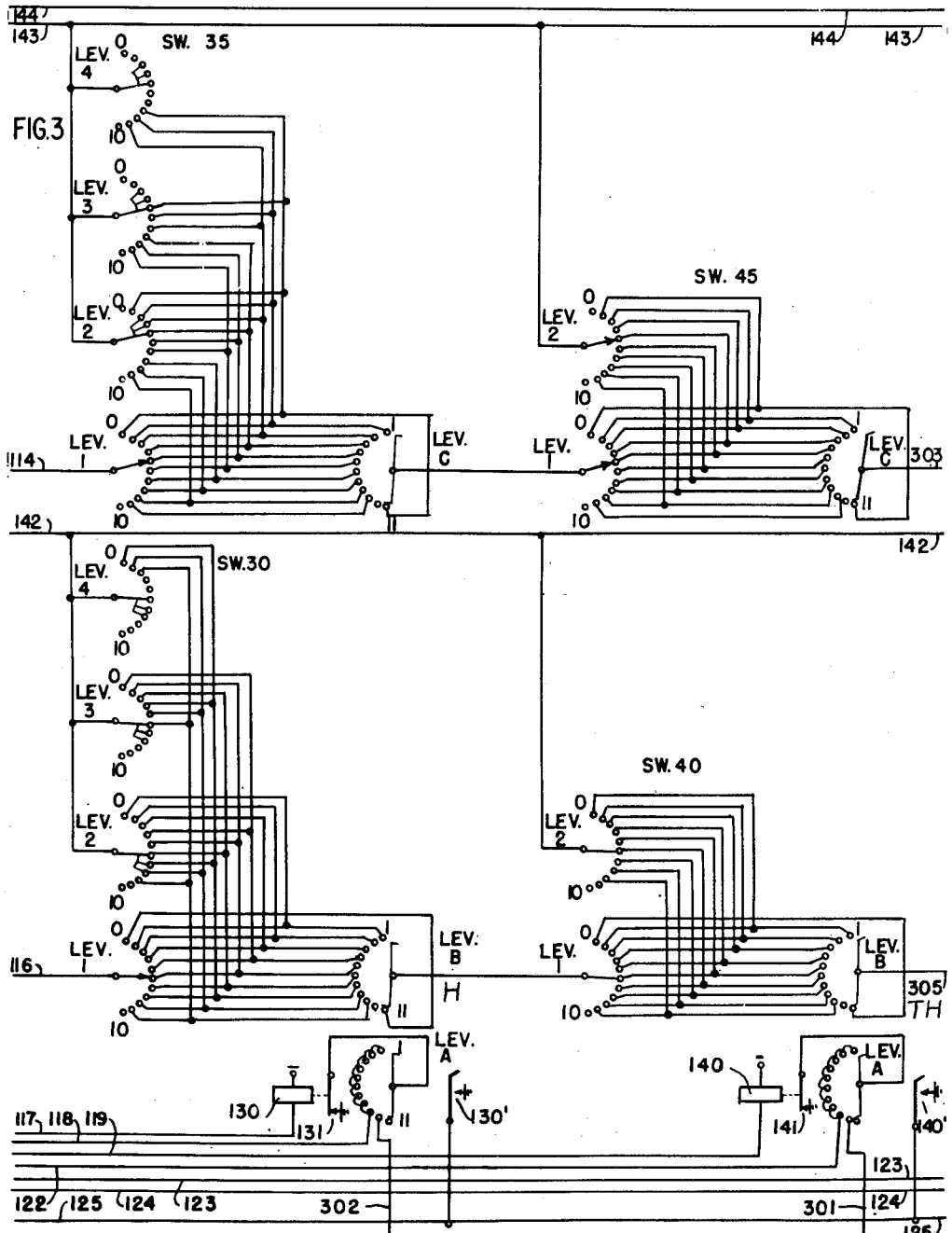

Figs. 1, 3, and 5 disclose a series of switches of which switches 10, 20, 30, 40 and 50 are manually operated, multi-level tap switches. These switches are called the positive limit selecting switches which are used to set up the positive limit as determined by Equation 1. These switches are capable of setting up any positive limit number between 1 and 99,999. Switch 10 sets up the units digit of the positive limit number, switch 20 the tens digit, switch 30 the hundreds digit, switch 40 the thousands digit, and switch 50 the ten thousands digit.

Switches 15, 25, 35, 45, and 55 are also manually operated, multi-level tap switches similar to switches 10—50 but are in this case used to set up the negative limit and are called the negative limit selecting switches. The negative limit selecting switches are also capable of setting up any limit between 1 and 99,999 and are associated with the setting of the units, tens etc., digits of the negative limit number in the same manner as are the positive limit selecting switches—i. e., switch 15 sets up the units digit, switch 25 sets up the tens digit etc. Besides the tap switches shown in Figs. 1, 3, and 5 there is a series of rotary switches U, TE, H, TH, TT, and HT. These switches are 11 point rotary switches each having three levels and are for the purpose of registering the totals accumulated by the machine. These switches are stepped upon deenergization of their respective motor magnets 110, 120, 130 etc.

Fig. 2 shows the input circuits, the various indicating registers, the negative and positive limit relays 200 and 210, the negative and positive limit alarms, and a remote control box.

Figure 4:
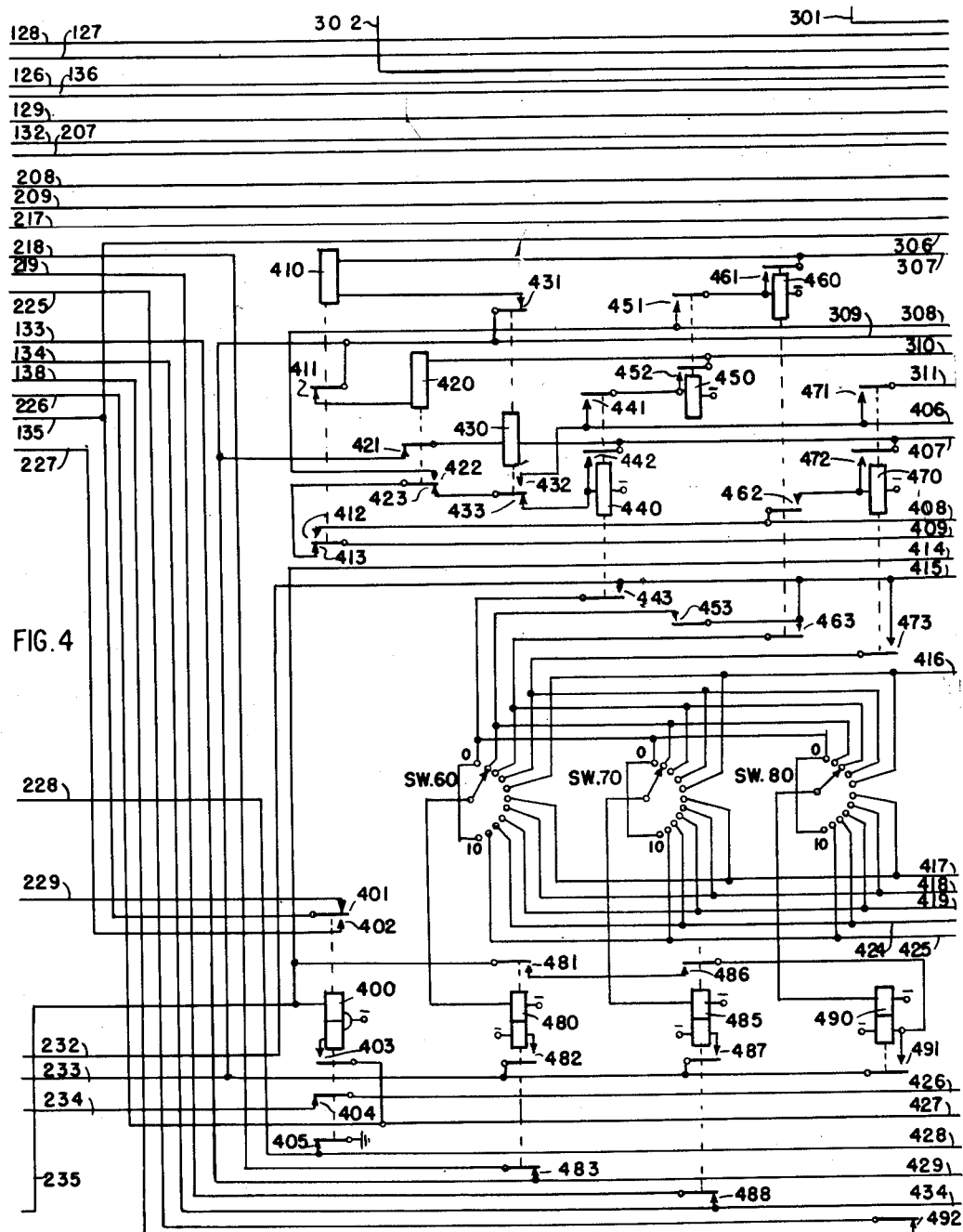
Figure 6:
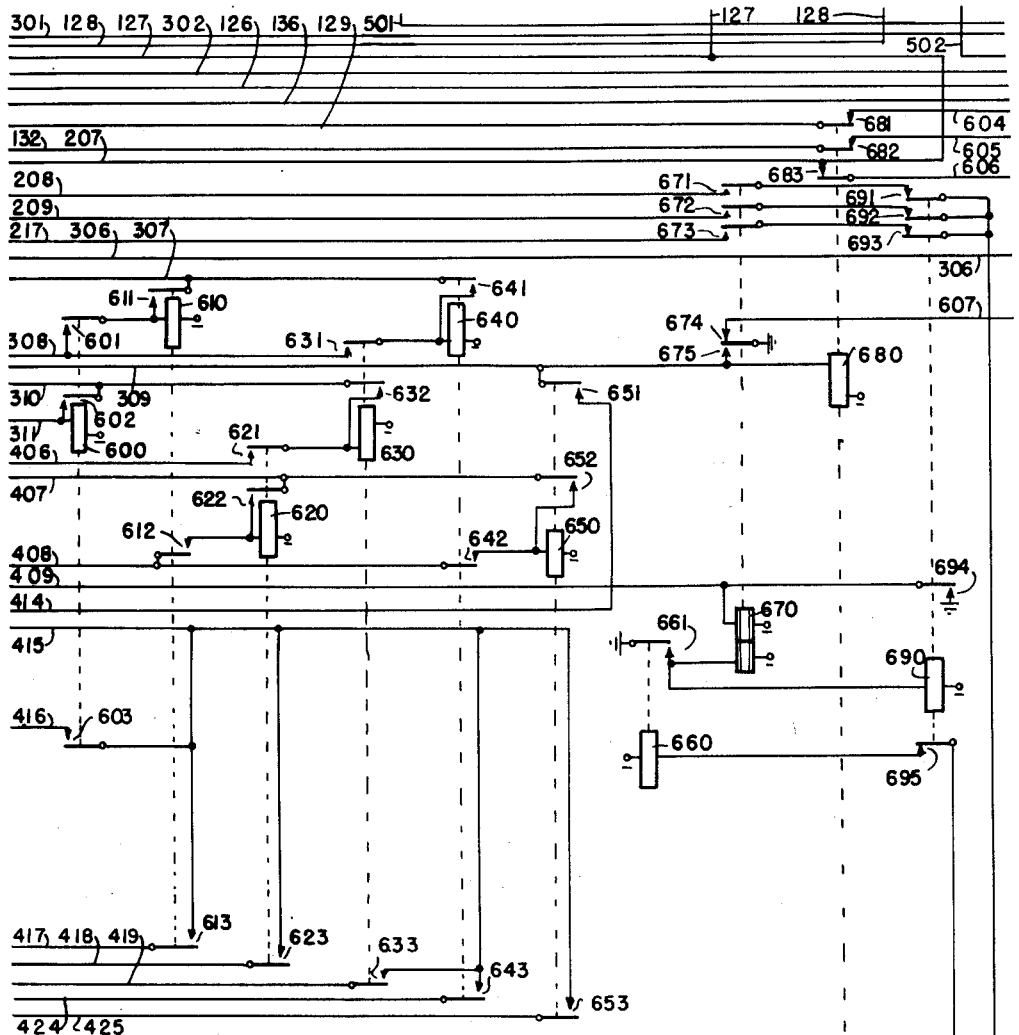

Fig. 4 shows three manually operated tap switches 60, 70, and 80 which are called the additive quantity selecting switches. They are capable of setting up any additive quantity between 1 and 999. Switch 80 sets the units digit, switch 70 the tens digit, and switch 60 the hundreds digit. Part of a relay register or counting chain is shown in the upper part of Fig. 4 and is continued in Fig. 6.

Figure 7:
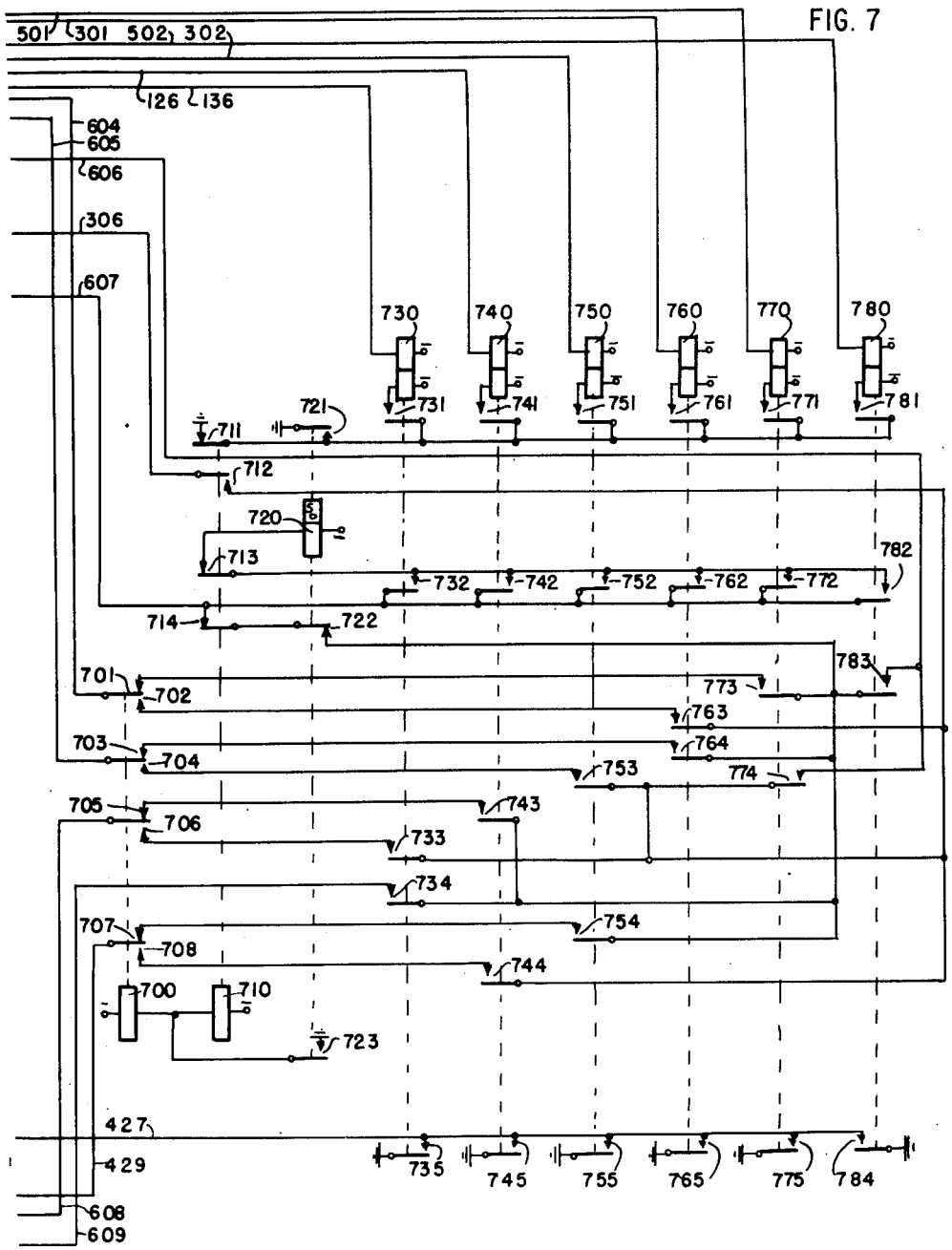

Fig. 7 shows a group of relays which are energized from the tenth contacts of the A levels of the rotary switches for the purpose of stepping the next succeeding rotary switch one step to thus register a carry over from the lower order switch. It will be noted that the rotary switches are 11 point switches and hence must automatically step once when the tenth position is reached. These relays also perform this function.

The operation of the device disclosed in the drawings is not reversible and subtractions cannot be made directly. Subtraction is effectively accomplished by adding a large number. When n is the number to be subtracted, the subtraction is obtained by adding $1,000,000-n$. In the present case, then, $n$ is 1000 and for each subtractive input to the machine, $1,000,000-1000$ or $999,000$ will be added to the total which will effectively subtract 1000, from the total registered by the register switches TH to HT.

A better understanding of the invention will be had by explaining the operation of the device for a specific example. Let us suppose that the additive quantity as computed by Equation 1 equals 112, the positive limit as computed by Equation 2 equals 45,555, and the negative limit as computed by Equation 3 equals 35,555. The drawings show the additive quantity selecting switches 60, 70, and 80 set to 112 and the positive limit selecting switches 10–50 set to 45,555. It will be appreciated that by adding 999,000 to the total carried by the rotary switches to subtract 1000 therefrom when the accumulated total is less than 1000, will result in an ambiguous negative number. This may be more clearly understood by taking the example where a positive total of, say, 376 is registered on the rotary switches. When 999,000 is added to this total it results in a new total of 999,376. This new total is known to be a negative number because the sixth digit to the left of the decimal is a 9 which, in this system, will always indicate a negative number. In order to interpret a negative total in terms of an absolute negative value, it is necessary to subtract the negative total from $1,000,000$. In this example, then, $1,000,000-999,376$ equals 624 which of course is $1000-376$.

In order to set up the negative limit of 35,555, which we have assumed is the result of substitution into Equation 3, we must interpret this number in terms of a negative total. This is done by subtracting 35,555 from 100,000 which gives us 64,445. This, then, is the negative limit which is actually set into the machine as is shown by the settings of switches 15–55. The rotary switches are assumed to be at zero.

The machine is now set up and ready to operate. When the input for addition circuit in Fig. 2 is closed, which may be accomplished by a key or any other suitable means, a circuit is completed for operating relays 240 and 250 in multiple. This circuit extends from ground at contacts 267 through the looped additive input circuit, contacts 223, and through the windings of relays 240 and 250 to battery. Relay 250 operates and completes a circuit to the positive register 91 from battery through register 91, contacts 252, conductor 228 to ground at contacts 405. Register 91 thus records the additive input. Relay 250 also completes a locking circuit for itself and relay 240 in multiple at contacts 253 from the ground at contacts 104 through conductor 135, contacts 401, and conductor 229. Relay 250 further completes a circuit to pulsing relay 660 by extending ground at contacts 254 through conductor 234, contacts 494, conductor 426, contacts 695 and winding of relay 660 to battery. Relay 220 operates over its lower winding from the ground at contacts 254. Relay 220 disables the subtractive input at contacts 221, and locks up over its upper winding to the ground returned over the looped additive input circuit through contacts 224. Relay 240 prepares circuits to various of the rotary switches at contacts 241 and 242.

Relay 660 operates and completes an obvious multiple energizing circuit for relays 670 and 690 at contacts 661. Relay 690 completes an energizing circuit for the upper winding of relay 670 at contacts 694, opens incomplete circuits to various of the rotary switches at contacts 691, 692, and 693, and opens the energizing circuit for relay 660 at contacts 695. Relay 690 also starts the operation of the relay counting chain by operating relay 440 from ground at contacts 694 through conductor 409, contacts 413, 423, 433, and the winding of relay 440 to battery. Relay 670 operates and prepares circuits to various of the rotary switches at contacts 671, 672, and 673, and completes an obvious energizing circuit for relay 680 at contacts 675.

It will be apparent from an examination of the circuits of relays 660 and 690 that these relays will alternately energize and deenergize by their own interaction as long as ground potential is maintained on conductor 426—i. e, relay 660 now restores and opens the circuit to relay 690 at contacts 661, relay 690 restores, reclosing the circuit to relay 660 which operates thus reclosing the circuit to relay 690 ad infinitum.

Return now to the first operation of relays 660 and 690 which resulted among other things, in the operation of relay 440. Relay 440 prepares a circuit for relay 430 at contacts 442 and prepares a circuit for relay 450 at contacts 441.

Relay 430 is at present shunted by the operating ground for relay 440 and the ground on conductor 309 from contacts 675. Relay 660 now restores opening the circuit to the lower winding of slow to release relay 670 and relay 690 at contacts 661. Relay 690 restores but relay 670 being slow to release holds operated. Relay 690, at contacts 694, removes the operating ground for relay 440 which now operates in series with relay 430 from the ground on conductor 309 through contacts 421, the winding of relay 430 and contacts 442. Relay 430 opens the original energizing circuit of relay 440 at contacts 433 and further prepares a circuit for relay 450 at contacts 432. Relay 690 also in restoring completes energizing circuits for the motor magnets 110, 120, and 130 of rotary switches U, TE, and H at contacts 691, 692, and 693. The circuit for motor magnet 110 may be traced as follows: from ground at contacts 405 through conductor 428, contacts 692, 672, conductor 209, contacts 241, conductor 225, contacts 492, conductor 138 and motor magnet 110 to battery. The circuit for motor magnet 120 extends from the same ground, through contacts 693, 673, conductor 217, contacts 242, conductor 219, contacts 488, conductor 134, and motor magnet 120 to battery. The circuit for motor magnet 130 may be traced in a similar manner.

The rotary switches do not step at this time as they are of the type which steps upon deenergization of their magnets.

It will be noted that the pulsing relay 690 closes energizing circuits to only the U, TE, and H rotary switch motor magnets. This is true because the additive quantity must always be some number between 1 and 999, thus involving only these three switches. The higher order switches TH, TT, and HT are stepped by a preceding lower order switch when a carry over is necessary.

Relay 660 now operates, causing relay 690 to operate in turn. Relay 690, in operating opens the energizing circuits for motor magnets 110, 120, and 130 at contacts 691, 692, and 693. In response to the deenergization of their motor magnets, switches U, TE, and H now take one step. Relay 690 also completes the energizing circuit for relay 450 by extending ground at contacts 694 through conductor 409, contacts 413, 423, 432, 441, and the winding of relay 450 to battery. Relay 450 prepares circuits for relays 420 and 460 at contacts 452 and 451 respectively. Relay 450 also completes a multiple energizing circuit for the cutoff relays 480 and 485 at contacts 453. This circuit may be traced from battery through the upper windings of relays 480 and 485, switch arms of tap switches 60 and 70, first contact position of switches 60 and 70, contacts 453, conductor 232, contacts 256, conductor 233, conductor 309, to ground at contacts 675. Relays 480 and 485 open the energizing circuits for the motor magnets 120 and 130 at contacts 483 and 488 thus preventing any further stepping of the associated rotary switches TE and H. Relays 480 and 485 also lock up over their lower windings through contacts 482 and 487 to their original operating ground as hereinbefore traced.

Relay 690 has now opened the circuit to relay 660 which restores causing relay 690 to restore in turn. Relay 690 in restoring completes the energizing circuit for motor magnet 110 at contacts 692, and removes the operating ground for relay 450 at contacts 694. Relay 420 now operates in series with relay 450 from ground at contacts 675 through conductor 309, contacts 411, winding of relay 420, contacts 452, and the winding of relay 450 to battery. Relay 420 prepares a circuit for relay 460 at contacts 422 and opens the series energizing circuit for relays 430 and 440 at contacts 421 thus causing them to restore. Relay 660 now operates causing relay 690 to operate in turn. In operating, relay 690 opens the circuit to motor magnet 110 at contacts 692 thus causing motor magnet 110 to restore and step rotary switch U one step. Relay 460 operates from the ground at contacts 694 through conductor 409, contacts 413, 422, 451, and winding of relay 460 to battery. Relay 460 prepares circuits for relays 410 and 470 at contacts 461 and 462 respectively, relay 460 further completes a circuit for cutoff relay 490 at contacts 463. Relay 490 operates over its upper winding from battery through the upper winding of relay 490, switch arm of tap switch 80, second contact position of switch 80, contacts 463, conductor 232, contacts 256, conductor 233, conductor 309 to ground at contacts 675. Relay 490 locks up over its lower winding to grounded conductor 309 through contacts 491 and opens the energizing circuit for motor magnet 110 of rotary switch U at contacts 492.

The wipers of the three rotary switches U, TE, and H are now standing on the second, first and first position contacts respectively to thereby register the number 112. The energizing circuits for the motor magnets of these switches are open by virtue of the energized condition of locked up cutoff relays 480, 485, and 490 so that no further stepping of the rotary switches will take place at this time. Relay 490 extends the ground on conductor 309 through contacts 491, 486, 481, and the upper winding of the main cutoff relay 400 to battery to thereby cause the operation of relay 400. Relay 400 completes a limit testing circuit at contacts 402, opens the energizing circuit for pulsing relay 660 at contacts 404, and further opens the energizing circuits for the rotary switch motor magnets at contacts 405. Relay 400 also opens the multiple holding circuit for relays 240 and 250 at contacts 401, thus causing these relays to restore. It will be noted that the operating ground for relay 400 is extended via conductor 235 to the total register 94 and battery. Total register 94 thus registers the additive input. Relay 250, at contacts 254 opens the circuit to relay 220 which consequently restores. Relay 660 now restores and causes relay 690 to restore in turn. Relay 690 removes ground from conductor 409 at contacts 694 thus causing relay 460 to now operate in series with 410 from ground at contacts 675 through conductor 309, contacts 431, winding of relay 410, contacts 461, and winding of relay 460 to battery. Relay 410 opens the series energizing circuit for relays 420 and 450 at contacts 411 causing these relays to restore. Slow to release relay 670, having lost its operating grounds at contacts 661 and 694, restores after a slight delay and removes ground from conductor 309 at contacts 675 thus causing relays 410, 460, and 690 to restore. In response to the removal of ground from conductor 309, relays 480, 485, 490 and 400 also restore. All of the circuits are now at normal and the machine is ready to receive another input, either additive or subtractive.

The machine will operate in the same manner as just described for subsequent additive inputs, the rotary switches adding 112 to the total already carried each time an additive input is made. Suppose that three more additive inputs are made to the machine in which case the rotary switches U, TE, and H will have registered the total 448 or 4 times 112. Suppose further that another, the fifth, additive input is made to the machine. The initial operation of the device will be the same as that already described. Relays 250, 240, and 220 operate in response to the closing of the additive input circuit. Pulsing relays 660 and 690 operate along with relays 670, 680, and 440. Briefly describing the circuit operations, relay 660 now restores causing relay 690 to restore in turn. The restoration of relay 690 causes the energization of motor magnets 110, 120, and 130 at contacts 691, 692, and 693 in a now familiar manner. Relay 440 also now operates in series with relay 430 in response to the removal of ground from conductor 409 by relay 690 to operate in turn. The energizing circuits for the motor magnets 110, 120, and 130 are now opened at contacts 691, 692, and 693 thus causing them to restore and step their respective rotary switches one more step. Relay 450 has now operated in response to the operation of relay 690 and has caused the operation of cutoff relays 480 and 485 to thereby prevent further stepping of the TE and H rotary switches. Relay 660 now restores causing relay 690 to restore in turn. Motor magnet 110 is now energized through contacts 692 and relay 450 operates in series with relay 420. Relay 660 again operates causing relay 690 to operate in turn. Motor magnet 110 now restores stepping the U rotary switch another step. Also relay 460 operates and completes the circuit for cutoff relay 490 at contacts 463. Relay 490 operates causing, among others, the restoration of relays 660, 670, 680, and 690. The wipers of rotary switch U are now resting on the tenth contact position, while the wipers of rotary switch TE are resting on the fifth contact position as are the wipers of rotary switch H. The rotary switches hence are registering the number 550. This number should be 5 times 112 or 560 hence a carry over must be made from the U rotary switch to the TE switch. This is accomplished in the following manner. The wiper on level A of rotary switch U extends the ground at contacts 111 through the tenth contact position of level A, conductor 136 (through Figs. 2, 4, and 6), and the upper winding of relay 730 to battery. Relay 730 locks up over its lower winding to ground at contacts 711 through contacts 731, completes an energizing circuit for slightly slow to operate relay 720 at contacts 732, prepares a circuit for motor magnet 120 at contacts 733, and completes a circuit for motor magnet 110 at contacts 734. The last named circuit may be traced from ground at contacts 674, through conductor 607, contacts 714, 722, 734, conductor 609, contacts 685, conductor 435, conductor 138, and winding of motor magnet 110 to battery. Slow to operate relay 720 now operates from grounded conductor 607 through contacts 732 and 713. Relay 720, in operating, opens the energizing circuit for motor magnet 110 at contacts 722 thus causing it to restore and step rotary switch U to the eleventh contact position. Relay 720 also completes an obvious energizing circuit for relays 700 and 710 at contacts 723. Relays 700 and 710 complete an energizing circuit for motor magnet 120 as follows: from ground at contacts 104 (Fig. 1) through conductor 135, conductor 306, contacts 712, 733, 706, conductor 608, contacts 684, conductor 434, conductor 134, and winding of motor magnet 120 to battery. Relay 710 also opens the energizing circuit for relay 720 at contacts 713 thus causing it to restore. Relay 720, in restoring causes relays 700 and 710 to restore by opening contacts 723. Relays 700 and 710 open the energizing circuit for motor magnet 120 causing it to restore and step the wipers of rotary switch TE to the sixth position. Relay 730 has now restored since its upper winding is deenergized when rotary switch U steps off the tenth position, and its lower locking winding is deenergized when relay 720 restores and opens contacts 721. The circuits are now at normal ready to receive another additive or subtractive input. The wipers of the rotary switches U, TE and H are resting on the eleventh, sixth, and fifth contacts positions respectively. Since the rotary switches are eleven point switches, the tenth position is designated as the carry over position and the eleventh position is designated as the zero position. The rotary switches now register 560 or 5 times 112. It will be understood that each time any of the rotary switches reached a tenth position it will energize its associated carry over relay (relays 730–780) to thereby step itself one extra step and step the succeeding or next higher order switch one additional step, in a manner similar to the carry over operation first described. The carry over stepping does not take place until the end of a regular pulsing cycle and for this reason the carry over relays are provided with locking circuits for their lower windings to hold them operated until the end of the pulsing cycle. Since several or all of the carry over relays can be operated at one time, the operating circuits for the rotary switch motor magnets which are through contacts on these relays are in the form of a series chain. This insures that an energizing circuit to a motor magnet cannot be closed from more than one source at a time and prevents lost operations. Furthermore, in order to insure that the carry over operations take place at the end of a pulsing cycle without interference from the start of another pulsing cycle, the carry over relays are arranged to lock the main cutoff relay 400 operated over its lower winding from ground at one of the contacts 735, 745, 755, 765, 775, or 784, through conductor 427, contacts 403, and the lower winding of relay 400 to battery. Relay 400, as has been explained, operates at the end of each pulsing cycle and opens the circuit to the pulsing relays 660 and 690.

In order to explain the operation of the machine when the positive limit is reached, let us assume that four hundred and seven successive additive inputs are made to the machine, in which case the total registered by the rotary switches will be 45,584. This total is greater than the positive limit 45,555 which has been manually set up on the machine by virtue of the positive limit selecting switches 10, 20, 30, 40 and 50. The machine operates in a now familiar manner for each additive input received. At the end of the last pulsing cycle, as at the end of each pulsing cycle, relay 400 operates in a hereinbefore explained manner. Relay 400 completes a testing circuit at the end of each pulsing cycle to see if the total carried by the rotary switch has reached one of the limits for which it has been set. This testing circuit may be traced from ground at contacts 104 (Fig. 1), through conductor 135, contacts 402, conductor 227, contacts 231, 212, 202, conductor 144 extending through Figs. 1, 3, and 5, to the wiper arms on the B and C levels of the hundred thousands order rotary switch HT. The C level of the rotary switches is concerned with testing for the negative limit and therefore will not be dealt with at this time. The B levels of the rotary switches are concerned with testing for the positive limit and under the presently assumed conditions, the ground appearing on the level B wiper of rotary switch HT is extended through the eleventh bank contact of this switch, the level B wiper of rotary switch TT and the fourth bank contact upon which it rests, the switch arm and fourth contact position on level 1 of tap switch 50, conductor 305, the level B wiper of rotary switch TH and the fifth bank contact upon which it rests, the switch arm and fifth contact position on level 1 of tap switch 40, the level B wiper of rotary switch H and the fifth bank contact upon which it rests, the switch arm and fifth contact position on level 1 of tap switch 30, conductor 116, the level B wiper of rotary switch TE and the eighth bank contact upon which it rests, the switch arm and seventh contact position on level 2 of tap switch 20, left on conductor 142, the upper winding of relay 210, conductor 226, contacts 493, and the lower winding of relay 400 to battery. The positive limit relay 210 operates and at preliminary make contacts 211, locks up over its lower winding to ground at contacts 103 on conductor 137. Relay 210 also opens the limits testing circuit at contacts 212 thus deenergizing its upper winding and the lower winding of relay 400. Relay 210 further, at contacts 215 and 216, completes obvious circuits for the positive limit alarm lamps 98 and 96, the positive limit register 93, and the general limit alarm buzzer 97. The positive limit register records the reaching of the positive limit while the buzzer 97 calls attention to the fact that a limit has been reached and lamps 98 and 96 indicates that the limit that has been reached is the positive limit. Relay 210 closes a circuit at contacts 213 for resetting the machine to zero. If the automatic reset key K2 is locked closed, the resetting operation will take place automatically, when the positive limit is reached. If K2 is not closed the machine may be reset manually by momentarily closing the non-locking key K1. In either case, ground is extended in an obvious manner through the winding of slow to release relay 100 to battery. Reset relay 100 completes a locking circuit for itself through contacts 101 from ground at any one or all of the contacts 110', 120', 130', 140', 150', or 160'. These last named contacts are off normal springs which are closed so long as the wiper of the rotary switch associated therewith is resting on any bank contact other than the eleventh. It is therefore apparent that conductor 125 will be grounded and relay 100 held operated until the wipers of all of the rotary switches are resting on their eleventh bank contacts or zero positions. Relay 100 completes individual self-interrupted circuits for each of the rotary switch motor magnets at contacts 102, 105, 106, 107, 108, and 109. One of these circuits, for example, extends from ground at contacts 121, through the wiper on level A of rotary switch TE, any of the bank contacts 1-9, contacts 105, and the winding of motor magnet 120 to battery. The self-interrupted circuits for the other motor magnets may be similarly traced. It is apparent, then, that the rotary switches will step their wipers over their bank contacts until the wipers of each of the switches is resting on its tenth bank contact (at least all of the rotary switches which were off normal when the reset relay operated which in this case means all of the rotary switches except HT). When the wipers reach their tenth bank contacts, they operate their respective carry over relays 730, 740, 750, 760, and 770 in a hereinbefore explained manner from ground at their motor magnet interrupter springs through their A level wipers. Relay 730 completes a circuit for slow to operate relay 720 at contacts 732, locks up over an obvious circuit through contacts 731, and completes an energizing circuit for motor magnet 110 at contacts 734. This last mentioned circuit may be traced from ground at contacts 674, through conductor 607, contacts 714, 722, 734, conductor 609, contacts 685, conductor 435, conductor 138, and the winding of motor magnet 110 to battery. Relays 740, 750, 760, and 770 complete similar circuits for motor magnets 120, 130, 140, and 150. The circuit for motor magnet 140, for a further example, may be traced from ground at contacts 674, through conductor 607, contacts 714, 722, 764, 703, conductor 605, contacts 682, conductor 132, conductor 119, and winding of motor magnet 140 to battery. The energizing circuits for motor magnets 120, 130, and 150 may be traced in a similar manner. Relay 720 soon operates, completing a further locking circuit for relays 730-770 at contacts 721, energizing relays 700 and 710 at contacts 723, and opening the energizing circuit for the energized motor magnets at contacts 722. The motor magnets restore thereby stepping rotary switches U, TE, H, TH, and TT to the eleventh or zero position. All of the switches are now at normal or zero position and their off normal springs 110'-160' are all open hence the locking circuit for the slow to release reset relay 100 is open. Relays 700 and 710 again complete circuits to the motor magnets as has been previously described in explaining the carry over operation but in this instance the ground from contacts 104 which would normally be extended through contacts 712 and the various chain circuits to energize the motor magnets, is not available because of the slow to release characteristics of reset relay 100 which is still holding contacts 104 open. This precludes the possibility of giving the rotary switches an additional unwanted step. Relay 710 opens the energizing circuit for relay 720 at contacts 713. Relay 720 restores and opens the locking circuit for the carry over relays at contacts 721 thus causing the carry over relays to restore since their upper windings were deenergized when the rotary switches stepped off of their tenth position. Relay 720 also opens the circuit for relays 700 and 710 causing them to restore. Reset relay 100 soon restores and the circuit is at normal with all rotary switches at zero ready to make a new analysis.

Before explaining the operation of the analyzer in regards to subtraction, it might be well to more closely examine the positive limit selecting tap switches 10-50. It will be noted that switches 10, 20, and 30 are four level switches and that switches 40 and 50 are two level switches. It will be further noted that certain of the upper levels of these switches have multiple switch arms. The purpose of these innovations will become clear when it is realized that the test circuit for determining when the positive limit has been reached is completed only at the end of a pulsing cycle and for this reason the test circuit must be capable of being extended through the tap switches for a multiplicity of positions of the rotary switches. For example suppose that the positive limit selecting switches are set for a positive limit of 7834. And suppose that, after a series of additive and subtractive inputs, the total registered by the rotary switches is 7833. Under these conditions the positive limit will be reached if the next input to the machine is an additive input but the additive input may conceivably be any number between 1 and 999 hence the tap switches must be capable of extending the testing circuit even though the rotary switches are registering a total lying anywhere between 7833+1 and 7833+999. The different levels of the tap switches are so multipled and their switch arms so arranged that they will extend the test circuit through to the positive limit relay for any number totaled by the rotary switches lying between the number to which the tap switches are set plus 999.

The operation of the machine in performing subtraction is essentially the same as for addition, 999,000 being added to the total carried by the rotary switches to thereby subtract 1000 from this total for each subtraction input to the machine. Suppose, for the purpose of illustration, that the rotary switches are carrying a total of 1784 when the subtractive input circuit is closed in which case the wipers of the U, TE, H, and TH rotary switches are resting on their fourth, eighth, seventh, and first bank contacts respectively. This input circuit (Fig. 2), like the additive input circuit, may be closed by any suitable means such as a key or relay, looping leads S— and S+. When the input circuit is closed, relay 260 operates from ground at contacts 255, through the looped conductors S+ and S—, contacts 221 and the winding of relay 260 to battery. Relay 260 completes a locking circuit for itself at contacts 265 from ground at contacts 104 through conductor 135, contacts 401, and conductor 229. Relay 260 also prepares incomplete circuits to rotary switches TH, TT, and HT at contacts 261, 262, and 263, registers the negative input by operating the negative register 90 from ground at contacts 405 through conductor 228 and contacts 264 and completes an energizing circuit for relays 220 and 660 in multiple at contacts 266. Relay 220 operates and opens the additive and subtractive input circuits at contacts 221 and 223. Relay 660 operates from ground at contacts 266 through conductor 234, contacts 404, conductor 426, contacts 695, and the winding of relay 660 to battery. Relay 660 initiates the pulsing operations in the same manner as has been explained for addition. Relay 660 completes an obvious multiple energizing circuit for slow to release relay 670 and relay 690. Relay 670 prepares incomplete circuits to the rotary switch motor magnets at contacts 671, 672, and 673 and energizes relay 680 at contacts 675. Relay 690 opens the circuits to the rotary switch motor magnets at contacts 691, 692 and 693. It will be appreciated that relay 690 operates faster than slow to release relay 670 and therefore opens the motor magnet circuits before relay 670 closes them. Relay 690 locks relay 670 operated over its upper winding at contacts 694 and extends this ground through conductor 409, contacts 413, 423, 433, and the winding of relay 440 to battery. Relay 690 also opens the circuit to relay 660 at contacts 695 causing it to restore. Relay 440 prepares circuits for relays 430 and 450 at contacts 442 and 441 respectively. Relay 660 restores and opens the circuit to relay 690 at contacts 661 (slow to release relay 670 holds operated during pulsing) causing relay 690 to restore in turn. Relay 440 now operates in series with relay 430 from ground at contacts 675 through conductor 309, contacts 421, the winding of relay 430, contacts 442, and the winding of relay 440 to battery. Relay 430 prepares a circuit for relay 450 at contacts 432. Relay 690, in restoring, completes energizing circuits to motor magnets 140, 150, and 160 at contacts 691, 692, and 693. These circuits extend from ground at contacts 405, through conductor 428, thence in multiple through contacts 691, 692, and 693, contacts 671, 672, and 673, conductors 208, 209, and 217, contacts 261, 262, and 263, the circuit for motor magnet 140 continuing from contacts 263 through conductor 132, conductor 119 and the winding of motor magnet 140 to battery. The circuit for motor magnet 150 continues from contacts 261 through conductor 129, conductor 123 and the winding of motor magnet 150 to battery. Finally, the circuit for motor magnet 160 continues from contacts 262 through conductor 207, conductor 127 and the winding of motor magnet 160 to battery. In restoring, relay 690 also reenergizes relay 660 at contacts 695. Relay 660 operates and causes relay 690 to operate in turn. Relay 690 opens the above traced energizing circuits for motor magnets 140, 150, and 160, thereby causing them to restore and step the wipers of rotary switches TH, TT, and HT one step along their bank contacts. Relay 690 also operates relay 450 by extending the ground at contacts 694 through conductor 409, contacts 413, 423, 432, 441, and the winding of relay 450 to battery. Relay 450 prepares circuits for relays 420 and 460 at contacts 452 and 451 respectively. Relay 690 opens the circuit to relay 660 at contacts 695 causing it to restore. Relay 660 opens the circuit to relay 690 at contacts 661 causing it to restore in turn. The circuits to motor magnets 140, 150, and 160 are again completed at contacts 691, 692, and 693. Relay 420 heretofore shunted by the ground at contacts 694, now energizes in series with relay 450 from ground at contacts 675 through conductor 309, contacts 411, the winding of relay 420, contacts 452, and the winding of relay 450 to battery. Relay 420 opens the series energizing circuit for relays 430 and 440 at contacts 421 causing them to restore. Relay 660 now operates causing relay 690 to operate in turn. Relay 690 opens the energizing circuits for motor magnets 140, 150, and 160 causing them to restore and step rotary switches TH, TT, and HT one more step. Relay 690 also extends the ground at contacts 694 through conductor 409, contacts 413, 422, 451, and the winding of relay 460 to battery. Relay 460 operates and prepares circuits to relays 470 and 410 at contacts 462 and 461 respectively. Up to this point the operation of the circuit has been essentially the same as it was for addition except that rotary switches TH, TT, and HT are being stepped instead of switches U, TE, and H. In the case of addition relay 450 completed an energizing circuit for cutoff relays 480 and 485 at contacts 453 through the switch arms and first contact positions of tap switches 60 and 70. This circuit, it will be remembered extended through contacts 256 to ground on conductor 309. In the case of subtraction, however, relay 250 is not energized and contacts 256 are open hence the cutoff relays will not be effective to stop the rotary switches in accordance with the number set up on the additive quantity selecting switches 60, 70, and 80. Relay 660 now restores causing relay 690 to restore in turn. The circuits for motor magnets 140, 150, and 160 are again closed at contacts 691, 692, and 693. The removal of ground at contacts 694 causes relay 410 to operate in series with relay 460 from ground on conductor 309 through contacts 431, the winding of relay 410, contacts 461, and the winding of relay 460 to battery. Relay 410 opens the series energizing circuit for relays 420 and 450 at contacts 411 causing them to restore. Relay 690 closes contacts 695 causing relay 660 to operate and close contacts 661 causing relay 690 to operate in turn. Relay 690 opens the motor magnet circuits causing them to restore and step switches TH, TT, and HT a third time. Relay 690 extends ground at contacts 694 through conductor 409, contacts 412, 462, and the winding of relay 470 to battery. Relay 470 prepares circuits for relays 430 and 600 at contacts 472 and 471 respectively. Relay 660 again restores causing relay 690 to restore in turn. Relay 690 reenergizes motor magnets 140, 150, and 160 and by removing ground at contacts 694, causes heretofore shunted relay 430 to operate in series with relay 470 from ground on conductor 309 through contacts 421, winding of relay 430, contacts 472, and the winding of relay 470 to battery. Relay 430 opens the series energizing circuit for relays 410 and 460 at contacts 431 causing them to restore. Relay 660 now operates causing relay 690 to operate in turn. Relay 690 again opens the energizing circuit for the motor magnets causing them to restore and step rotary switches TH, TT, and HT a fourth time. Relay 690 operates relay 600 from ground at contacts 694 through conductor 409, contacts 413, 423, 432, 471, and the winding of relay 600 to battery. Relay 600 prepares circuits for relays 420 and 610 at contacts 602 and 601 respectively. Relay 690 opens contacts 695 causing relay 660 to restore and open contacts 661 thereby causing relay 690 to restore in turn. Relay 690 reenergizes motor magnets 140, 150, and 160 at contacts 691, 692, and 693, and by removing the ground at contacts 694, causes relay 420 to operate in series with relay 600 from ground on conductor 309 through contacts 411, the winding of relay 420, conductor 310, contacts 602, and the winding of relay 600 to battery. Relay 420 opens the series energizing circuit for relays 430 and 470 at contacts 421 causing them to restore. Relay 660 now operates causing relay 690 to operate in turn. Relay 690 again opens the energizing circuits for motor magnets 140, 150, and 160 causing them to restore and step rotary switches TH, TT, and HT a fifth time. Relay 690 also extends the ground at contacts 694 through conductor 409, contacts 413, 422, conductor 308, contacts 601, and winding of relay 610 to battery. Relay 610 operates and prepares circuits for relays 410 and 620 at contacts 611 and 612 respectively. Relay 660 now restores causing relay 690 to restore in turn. Relay 690 again energizes motor magnets at contacts 691, 692, and 693. The removal of ground at contacts 694 causes relay 410 to now operate in series with relay 610 from ground at contacts 675 through conductor 309, contacts 431, winding of relay 410, conductor 307, contacts 611, and the winding of relay 610 to battery. Relay 410 opens the series energizing circuit for relays 420 and 600 at contacts 411 causing them to restore. Relay 660 now operates causing relay 690 to operate in turn. Relay 690 opens the motor magnet circuits causing them to step rotary switches TH, TT, and HT a sixth time. Relay 690 also causes relay 620 to operate from ground at contacts 694, through conductor 409, contacts 412, conductor 408, contacts 612, and winding of relay 620 to battery. Relay 620 prepares circuits for relays 630 and 430 at contacts 621 and 622 respectively. Relay 660 now restores causing relay 690 to restore in turn. Relay again energizes motor magnets 140, 150, and 160 and by removing ground at contacts 694 causes relay 430 to operate in series with relay 620 from grounded conductor 309 through contacts 421, winding of relay 430, conductor 407, contacts 622, and the winding of relay 620 to battery. Relay 430 opens the series energizing circuit for relays 610 and 410 at contacts 431 causing them to restore. Relay 690 causes relay 660 to operate and at contacts 661, relay 660 causes relay 690 to operate in turn. Relay 690 again opens the energizing circuits for the motor magnets causing them to restore and step rotary switches TH, TT, and HT a seventh step. Relay 690 also causes relay 630 to operate from ground at contacts 694 through conductor 409, contacts 413, 423, 432, conductor 406, contacts 621, and the winding of relay 630 to battery. Relay 630 prepares circuits for relays 420 and 640 at contacts 632 and 631 respectively. Relay 660 now restores causing relay 690 to restore in turn. Relay 690 reenergizes the motor magnets and by removing ground at contacts 694, causes the heretofore shunted relay 420 to operate in series with relay 630 from grounded conductor 309 through contacts 411, winding of relay 420 conductor 310, contacts 632, and winding of relay 630 to battery. Relay 420 opens the series energizing circuit for relays 430 and 620 at contacts 421 thus causing them to restore. Relay 690 operates relay 660 at contacts 695 causing relay 660 to close contacts 661 and operate relay 690 in turn. Relay 690 opens the motor magnet circuits causing them to restore and step rotary switches TH, TT, and HT an eighth time. Relay 690 also causes relay 640 to operate from ground at contacts 694 through conductor 409, contacts 413, 422, conductor 308, contacts 631, and the winding of relay 640 to battery. Relay 640 prepares energizing circuits for relays 410 and 650 at contacts 641 and 642 respectively. Relay 660 now restores causing relay 690 to restore in turn. Relay 690 reenergizes the motor magnets and by removing ground at contacts 694 causes relay 410 to operate in series with relay 640 from grounded conductor 309 through contacts 431, winding of relay 410, conductor 307, contacts 641, and the winding of relay 410 to battery. Relay 640 opens the series energizing circuit for relays 420 and 630 at contacts 411 thus causing them to restore. Relay 660 now operates causing relay 690 to operate in turn. Relay 690 opens the energizing circuits for the motor magnets causing them to restore and step rotary switches TH, TT, and HT a ninth time. The wipers of rotary switches TH, TT, and HT are now resting on their tenth, ninth, and ninth bank contacts respectively. The wiper on level A of rotary switch TH extends the ground from contacts 141 through the tenth bank contact, conductor 301, and the upper winding of relay 760 to battery. Relay 760 prepares circuits for the carryover operation which will be described presently. Relay 650 operates from ground at contacts 694 through conductor 409, contacts 412, conductor 408, contacts 642, and the winding of relay 650 to battery. Relay 650 prepares a circuit for relay 430 at contacts 652 and completes a circuit for the main cutoff relay 400 at contacts 651. The last named circuit may be traced from ground at contacts 675 through contacts 651, conductor 414, and the upper winding of relay 400 to battery. Relay 400 completes a hereinbefore traced limit testing circuit at contacts 402, opens the energizing ground circuit for relay 660 at contacts 404, removes ground from conductors 223 and 428 at contacts 405, and locks up over its lower winding from ground at contacts 765 via conductor 427 and contacts 403. Relay 400 also opens the locking ground for relay 260 at contacts 401 thus causing relay 260 to restore which in turn causes relay 220 to restore. Relay 660 now restores causing relay 690 to restore in turn. The energizing ground for the motor magnets has now been removed at contacts 405 hence the closing of contacts 691, 692, and 693 will now be ineffective. Relay 690 removes at contacts 694 thereby causing relay 430 to operate in series with relay 650 from ground at contacts 675 through conductor 309, contacts 421, winding of relay 430, conductor 407, contacts 652, and the winding of relay 650 to battery. Relay 430 opens the series energizing circuit for relays 410 and 640 at contacts 431 thus causing these relays to restore. Slow to release relay 670 soon restores and removes ground from conductor 309 at contacts 675 causing relays 680, 430, and 650 to restore. At this point relays 400 and 760 are still operated. The ground at contacts 674 is now extended through conductor 607, contacts 714, 722, 764, 703, conductor 605, contacts 682, conductor 132 (through Figs. 4 and 2) conductor 119, and the winding of motor magnet 140 to battery. The same ground at contacts 674 is extended through condutor 607 contacts 762, 713, and the winding of slow to operate relay 720 to battery. This circuit was completed at the same instant as the traced circuit to motor magnet 140 but due to the slow to operate characteristics of relay 720, the circuit to motor magnet 140 was completed before relay 720 operated. Relay 720 locks relay 760 up at contacts 721 and completes an obvious energizing circuit for relays 700 and 710 at contacts 723. Relay 720 also opens the energizing circuit for motor magnet 140 at contacts 722 thus causing it to restore and step the wipers of rotary switch TH to their eleventh or zero position. The ground on conductor 306 (from contacts 104 Fig. 1) is now extended through contacts 712, 763, 782, conductor 604, contacts 681, conductor 129, conductor 123, and the winding of motor magnet 150 to battery. Relay 710 opens the energizing circuit for relay 720 at contacts 713 thus causing relay 720 to restore. Relay 720 removes the locking ground for relay 760 at contacts 721 causing relay 760 to restore and opens the energizing circuit for relay 700 and 710 at contacts 723 causing these relays to restore. Relay 700 in restoring opens the energizing circuit for motor magnet 150 at contacts 701 causing it to restore and step the wipers of rotary switch TT to their tenth position. The wiper on level A or rotary switch TT now extends the ground at contacts 151 through the tenth bank contact of level A, conductor 501, and the upper winding of relay 770 to battery. The carry over cycle just explained for rotary switches TH and TT is now repeated for switches TT and HT. The ground at contacts 674 is extended through conductor 607, contacts 714, 722, 773, 701, conductor 604, contacts 681, conductor 129, conductor 123, and the winding of motor magnet 150 to battery. Relay 720 now operates and opens this circuit causing rotary switch TT to step to its eleventh or zero position. Relays 700 and 710 operate in response to the operation of relay 720. The ground on conductor 306 is now extended through contacts 712, 774, conductor 606, contacts 683, conductor 127, and the winding of motor magnet 160 to battery. Relay 720 restores in response to the operation of relay 710 and causes relay 770, 700 and 710 to restore in turn. Relay 770 opens the circuit to motor magnet 160 at contacts 774 causing it to restore and step the wipers of rotary switch HT to their tenth positions. The wiper on level A of rotary switch HT extends the ground at contacts 161 through the tenth bank contact of level A, conductor 502, and the upper winding of relay 780 to battery. The ground at contacts 674 is now extended through conductor 607 contacts 714, 722, 783, conductor 606, contacts 683, conductor 127, and the winding of motor magnet 160 to battery. Relay 720 now operates and opens this circuit at contacts 722 causing motor magnet 160 to set up the wipers of rotary switch HT to their eleventh or zero positions. Relays 700 and 710 operate causing relay 720 to restore which causes relays 780, 700, and 710 to restore in turn. During this carry over operation one of the carry over relays 760, 770 or 780 has always been operated and consequently the main cutoff relay 400 has been held up over its lower winding from the ground at one of the contacts 765, 775, or 784. When relay 780 restores this ground is removed hence relay 400 restores and the circuit is at normal. The rotary switches now register 784 or 1784 −1000. If the rotary switches had registered a total of 784 instead of 1784 when the subtractive input circuit was first closed, the subtractive process would have taken place in a similar manner but would have resulted in the rotary switches registering 999,000 +784 or 999,784. This, as has been explained, is an ambiguous negative value. The true negative value may be obtained by subtracting 999,784 from 1,000,000 which is 216 or the same as 1000−784. It will be again noted that any total registered by the rotary switches which has the digit nine six places to the left of the decimal will be a negative number.

Suppose now that the rotary switches are reset to zero and that thirty-six successive negative inputs are made to the machine. Under these conditions the rotary switches will register 999,000 times 36 or 35,964,000. The seventh and eighth place digits are out of the range of this machine hence the rotary switches will actually register 964,000. This negative total is lower than the negative limit of 64,445 for which the machine is set. At the end of the thirty-sixth pulsing cycle, relay 400 operates in a now familiar manner and completes a testing circuit to determine if one of the limits has been reached. This testing circuit, as has been hereinbefore traced, extends from ground at contacts 104 (Fig. 1) through conductor 135, contacts 402, conductor 227, contacts 231, 212, 202, conductor 144 (through Figs. 1, 3 and 5), to the B and C level wipers of rotary switch HT. The B levels of the rotary switches, which are concerned with determining the positive limit, are ineffective in this case because the wipers of rotary switch HT are resting on their ninth bank contacts and this is a blank contact on level B. The test circuit is, however, extended through the ninth bank contact on level C, the level C wiper of rotary switch TT and the sixth bank contact upon which it rests, the sixth contact and switch arm on level 1 of tap switch 55, conductor 303, the level C wiper of rotary switch TH and the fourth bank contact upon which it rests, the fourth contact and switch arm on level 1 of tap switch 45, the C level wiper of rotary switch H and the eleventh, or zero bank contact upon which it rests, the fourth contact and switch arm on level 3 of tap switch 35, conductor 143 (through Figs. 1 and 2), the upper winding of the negative limit relay 200, conductor 226, contacts 403, and the lower winding of relay 400 to battery. Relay 200 operates and at preliminary make contacts 201 locks up over its lower winding to the ground at contacts 103. Relay 200 also opens the just traced limit testing circuit at contacts 202, thus releasing relay 400, completes an energizing circuit for the negative limit register 92 and the negative limit lamps 95 and 99 at contacts 205, and completes an energizing circuit for the buzzer 97 at contacts 206. The buzzer alarm 97 indicates to the operator that a limit has been reached and the negative limit lamps 95 and 99 indicate that the negative limit is the one which has been reached. There is no automatic reset for the machine when the negative limit is reached as there was when the positive limit is reached. Reaching the negative limit means that the lot under test has failed to meet the required standards and is therefore rejected hence some adjustment in the production line is in order. The buzzer alarm will therefore continue to sound until the machine is reset manually. The resetting of the machine is accomplished by closing the non-locking key K1 to thereby operate relay 100 in an obvious manner. Relay 100 opens the locking circuit for relay 200 at contacts 103 thus causing relay 200 to restore and stop the negative limit indicating means 95, 99, and 97. The resetting of the rotary switches to zero now proceeds in the same manner as has been explained in connection with the reaching of the positive limit.

Various levels of the negative limit selecting tap switches 15, 25, and 35 have multiple switch arms as do switches 10, 20, and 30. This is for the same purpose as has been explained for switches 10, 20 and 30, namely, to extend the negative limit testing circuit even though the actual negative limit has been exceeded.

It will be noted that the machine is equipped with a remote control box as indicated by the blocked off portion in the lower left hand corner of Fig. 2. This remote control box may be located at the scene of testing at a distance from the machine if the testing conditions find this to be an advantageous arrangement. Additive and subtractive inputs may be made from the control box by operating keys K4 or K3 in an obvious manner.

The machine is provided with an alarm cutoff relay 230 which may be operated by either of keys K5 or K6. The alarm cutoff relay 230, when operated, opens the limit testing at contacts 231 thus preventing the machine from determining when a positive or negative limit has been reached. This may be of advantage in some special counting or testing operations.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a calculating system, a device including a first set of switches manually set by an operator to register a predetermined positive amount, a second set of switches manually set by said operator to register a predetermined negative amount, and a third set of switches manually set by said operator to register predetermined additive amount, means for electrically transmitting additive and negative input signals to said device, means including said third switch set for translating each additive input signal received into a predetermined additive positive amount, means in said device for translating each negative input signal received into a predetermined subtractive negative amount, a fourth set of switches in said device operated in response to each said translated predetermined additive positive amount received for cumulatively adding said predetermined additive positive amounts, said fourth set of switches operated in response to each said translated predetermined subtractive amount received for subtracting said predetermined subtractive negative amount to register a resultant amount corresponding to the difference between the additive and subtractive amounts received, an alarm, and means operative in response to said fourth set of switches registering a resultant amount corresponding to said predetermined positive amount registered on said first set of switches or operative in response to said fourth set of switches registering a resultant amount corresponding to said predetermined negative amount registered on said second set of switches for operating said alarm.

2. In a calculating system, a device including a first set of switches manually set by an operator to register a predetermined positive amount, and a second set of switches manually set by said operator to register a predetermined negative amount, means for electrically transmitting additive input signals and negative input signals to said device, a third set of switches in said device operated in response to each transmitted input signal for cumulatively adding each additive input signal and for subtracting each negative input signal to register a resultant amount corresponding to the difference between said transmitted additive and negative input signals, an indicating device, means including circuits jointly controlled by said first and third sets of switches for operating said indicating device in response to said third set of switches registering a resultant amount corresponding to said predetermined positive amount registered on said first set of switches, and means including other circuits jointly controlled by said second and third sets of switches for operating said indicating device in response to said third set of switches registering a resultant amount corresponding to said predetermined negative amount registered on said second set of switches.

3. In a calculating system, a device including a first registering means operated to register a predetermined positive amount and a predetermined negative amount, means for transmitting additive inputs and subtractive inputs to said device, means in said device for translating each additive input received into a predetermined additive amount and for translating each subtractive input received into a predetermined subtractive amount, a second registering means in said device operated in response to each said translated predetermined additive amount for cumulatively adding said predetermined additive amounts and said second registering means operated in response to each said translated predetermined subtractive amount for subtracting said predetermined subtractive amounts to register a resultant amount corresponding to the difference between said additive amounts and the subtractive amounts, and indicating means operative in response to said second registering mechanism registering a resultant amount corresponding to either said predetermined positive amount or to said predetermined negative amount registered on said first registering means.

4. In a calculating system, a device, means for electrically transmitting additive inputs and negative inputs to said device, means in said device for translating each additive input received into a predetermined positive additive amount, means in said device for translating each negative input received into a predetermined subtractive negative amount, registering means in said device operated in response to each additive input received for cumulatively adding said predetermined additive positive amount and operated in response to each negative input received for subtracting said predetermined subtraction negative amount to thereby register a resultant positive amount or a resultant negative amount dependent upon the number of additive and negative inputs received, indicating means, and means for operating said indicating means in response to said registering means registering a resultant predetermined positive amount or a resultant predetermined negative amount.

5. In a calculating system, a device including a first registering means operated to register a predetermined positive amount and a predetermined negative amount, means for transmitting additive and negative inputs to said device, a second registering means in said device operated in response to each transmitted input for cumulatively adding each additive input and for subtracting each negative input to register a resultant amount corresponding to the difference between the received additive and negative inputs, and indicating means operative in response to said second registering means registering a resultant amount corresponding to either said predetermined positive amount or to said predetermined negative amount registered on said first registering means.

6. In a calculating system, a device including a first registering means operated to register a predetermined positive amount and a predetermined negative amount, means for transmitting additive and negative inputs to said device, a second registering means in said device operated in response to each transmitted input for cumulatively adding each additive input and for subtracting each negative input to registed a resultant amount corresponding to the difference between the received additive and negative inputs, indicating means, and means including circuits jointly controlled by said first and second registering means for operating said indicating means in response to said second registering means registering a resultant amount corresponding to either said predetermined positive amount or to said predetermined negative amount registered on said first registering means.

7. In a calculating system, a device including a first registering means operated to register a predetermined positive amount and a predetermined negative amount, means for transmitting additive and negative inputs to said device, a second registering means in said device operated in response to each transmitted input for cumulatively adding each additive input and for subtracting each negative input to register a resultant amount corresponding to the difference between the received additive and negative inputs, a positive limit indicating means, a negative limit indicating means, means including a circuit jointly controlled by said first and second registering means for operating said positive limit indicating means in response to said second registering means registering a resultant amount corresponding to said predetermined positive amount registered on said first registering means, and means including another circuit jointly controlled by said first and second registering means for operating said negative limit indicating means in response to said second registering means registering a resultant amount corresponding to said predetermined negative amount registered on said first registering means.

8. In a calculating system, a device, means for electrically transmitting additive inputs and negative inputs to said device, a set of switches in said device operated in response to each transmitted input for cumulatively adding each additive input and for subtracting each negative input to register a resultant positive amount or to register a resultant negative amount dependent upon the number of additive and negative inputs received, indicating means, and means for operating said indicating means in response to said switches registering a predetermined resultant positive amount or a predetermined resultant negative amount.

9. In a calculating system as claimed in claim 8 including reset means, and means responsive to the operation of said indicating operating means for operating said reset means to automatically reset said set of switches to zero registering position.

10. In a calculating system, a device including a plurality of step-by-step digit registering switches comprising a hundreds digit switch, a tens digit switch, and a units digit switch, means for electrically transmitting input signals to said device; means in said device including manual preset registers for translating each received input signal into electrical impulses representing a multi-digit number comprising a predetermined hundreds digit, a predetermined tens digit, and a predetermined units digit; cut-off relays individual to each of said switches, and circuits in said device controlled by said cut-off relays for simultaneously transmitting said electrical impulses representing said predetermined hundreds, tens, and units digits to said switches in response to each input signal received for simultaneously operating said switches to add said predetermined digits to a previous registered total in said switches.

11. In a calculating system as claimed in claim 10 including relays controlled by said switches for transmitting a carryover pulse to operate the next higher order digit switch after said simultaneous operations in case any one of said switches is operated to register a sum of ten or greater.

12. In a calculating system as claimed in claim 11 including a cut-off relay controlled by any one of said relays for preventing the translation of subsequent input signals into said electrical impulses until after said carryover operation is performed.

13. In a calculating system, a series of digit register switches corresponding to the different orders of digits of a multi-digit number; a stepping magnet, a preset switch and a cut-off relay for each register switch, each preset switch manually set by an operator to a position corresponding to a predetermined digit; a series of counting relays sequentially operated to transmit impulses to the stepping magnets of said register switches, a common pulsing relay intermittently operated for controlling the stepping operation of all of said register switches, circuits controlled jointly by said counting relays and the set positions of said present switches for selectively operating said cut-off relays, contacts on each operated cut-off relay for preventing further impulse transmission to their respective corresponding register switches, said stepping magnet in each register switch operated in response to said impulses for operating said register switches one step for each impulse received to thereby register said predetermined digits in said respective digit register switches, a main cut-off relay, a chain circuit for operating said main cut-off relay completed in response to operation of all said first mentioned cut-off relays, and contacts controlled by said operated main cut-off relay for preventing further operations of said counting relays.

14. In a calculating system, a series of digit register switches corresponding to the different orders of digits of a multi-digit number; a stepping magnet, a preset switch and a cut-off relay for each register switch, each preset switch manually set by an operator to a position corresponding to a predetermined digit; a series of counting relays sequentially operated to transmit impulses to the stepping magnets of said register switches, a common pulsing relay intermittently operated for controlling the stepping operation of all of said register switches, circuits controlled jointly by said counting relays and the set positions of said preset switches for selectively operating said cut-off relays, contacts on each operated cut-off relay for preventing further impulse transmission to their respective corresponding register switches, said stepping magnet in each register switch operated in response to said impulses for operating said register switches one step for each impulse received to thereby register said predetermined digits in said respective digit register switches, a main cut-off relay, a chain circuit for operating said main cut-off relay completed in response to operation of all said first mentioned cut-off relays, contacts controlled by said operated main cut-off relay for preventing further operations of said counting relays, a carryover relay operated in case one of said digit register switches is operated to register a sum of ten or greater, and a locking circuit for said main cut-off relay controlled by said operated carryover relay.

ROY W. JONES.

REFERENCES CITED

The following references are of record in the file of this patent:

UNITED STATES PATENTS

| Number | Name | Date |
|---|---|---|
| 1,927,702 | Foss | Sept. 19, 1933 |
| 1,933,352 | Tauschek | Oct. 31, 1933 |
| 2,049,634 | Troutman | Aug. 4, 1936 |
| 2,074,392 | Herbst | Mar. 23, 1937 |
| 2,079,429 | Tauschek | May 4, 1937 |
| 2,087,039 | McMaster | July 13, 1937 |
| 2,099,754 | Robinson | Nov. 23, 1937 |
| 2,131,497 | Borel | Sept. 27, 1938 |
| 2,172,078 | Zigueldе | Sept. 5, 1939 |
| 2,176,932 | Smith | Oct. 24, 1939 |
| 2,195,850 | Cunningham et al. | Apr. 2, 1940 |
| 2,254,932 | Boyce | Sept. 2, 1941 |
| 2,377,764 | Dickinson | June 5, 1945 |
| 2,402,988 | Dickinson | July 2, 1946 |